(12) United States Patent
Goodyear et al.

(10) Patent No.: US 9,470,326 B2
(45) Date of Patent: Oct. 18, 2016

(54) APPARATUS, SYSTEM, AND METHOD FOR VENTING PRESSURE IN A PRESSURIZED SYSTEM

(75) Inventors: Eric Alan Goodyear, Broken Arrow, OK (US); Adam Marcus Lorenz, Catoosa, OK (US)

(73) Assignee: Oklahoma Safety Equipment Company, Inc., Broken Arrow, OK (US)

( * ) Notice: Subject to any disclaimer, the term of this patent is extended or adjusted under 35 U.S.C. 154(b) by 486 days.

(21) Appl. No.: 13/436,097

(22) Filed: Mar. 30, 2012

(65) Prior Publication Data
US 2012/0248108 A1 Oct. 4, 2012

Related U.S. Application Data

(60) Provisional application No. 61/470,943, filed on Apr. 1, 2011.

(51) Int. Cl.
*F16K 17/16* (2006.01)
*B65D 51/16* (2006.01)

(52) U.S. Cl.
CPC .............. *F16K 17/16* (2013.01); *B65D 51/16* (2013.01); *Y10T 29/49826* (2013.01)

(58) Field of Classification Search
CPC .. F16K 17/16; Y10T 29/49826; B65D 51/16
USPC ................ 220/202, 203.01, 203.11, 203.16, 220/203.18, 367.1, 213, 315, 324, 325; 292/3; 277/634, 635; 215/260, 271
See application file for complete search history.

(56) References Cited

U.S. PATENT DOCUMENTS 5,036,632 A  8/1991 Short, III et al.
6,070,365 A  6/2000 Leonard
(Continued)

FOREIGN PATENT DOCUMENTS

EP  0 773 393 A2  5/1997

OTHER PUBLICATIONS

Notification of Transmittal of the International Search Report and the Written Opinion of the International Searching Authority, or the Declaration from the International Bureau of WIPO for International Application No. PCT/US 12/31576 dated Jun. 28, 2012, 10 pages.
(Continued)

*Primary Examiner* — Robert J Hicks
*Assistant Examiner* — Kareen Rush
(74) *Attorney, Agent, or Firm* — Fitch, Even, Tabin & Flannery LLP

(57) ABSTRACT

In one form, a vent apparatus includes an inlet frame, a venting member, and a retainer member. The venting member includes a mounting portion, a weakened area or burst slit, and a domed portion. The mounting portion of the venting member is secured between the inlet frame and the retainer member. The retainer member includes vent retainer portions or tab portions that extend over the burst slit. The vent apparatus is configured to burst when an inlet pressure exceeds a predetermined level, where the tab portions will bend away and the venting member will bend past the tab portions to relieve the pressure. The inlet frame is configured to support against a vacuum pressure acting in the opposite direction, with the tab portions generally free from the load caused by the vacuum pressure.

24 Claims, 15 Drawing Sheets

(56) References Cited

U.S. PATENT DOCUMENTS

| | | | |
|---|---|---|---|
| 6,367,203 B1 | 4/2002 | Graham et al. | |
| 7,017,767 B2 * | 3/2006 | Eijkelenberg et al. | 220/89.2 |
| 7,237,698 B2 | 7/2007 | Jackman | |
| 7,735,671 B2 | 6/2010 | Eijkelenberg et al. | |
| 7,784,482 B2 | 8/2010 | Farwell et al. | |
| 8,322,360 B2 * | 12/2012 | Wilson | 137/68.23 |
| 8,517,042 B2 * | 8/2013 | Khamitkar | 137/68.29 |
| 8,622,071 B2 * | 1/2014 | Wilson | 137/68.23 |
| 8,726,588 B2 * | 5/2014 | Jakus et al. | 52/203 |
| 2005/0103786 A1 * | 5/2005 | Eijkelenberg | B65D 90/36 |
| | | | 220/89.2 |
| 2007/0181183 A1 | 8/2007 | Farwell et al. | |
| 2007/0234655 A1 | 10/2007 | Jakus et al. | |

OTHER PUBLICATIONS

Extended European Search Report and European Search Opinion issued in counterpart European Application No. 12 76 3035.8, dated Apr. 28, 2015 (7 pages).

* cited by examiner

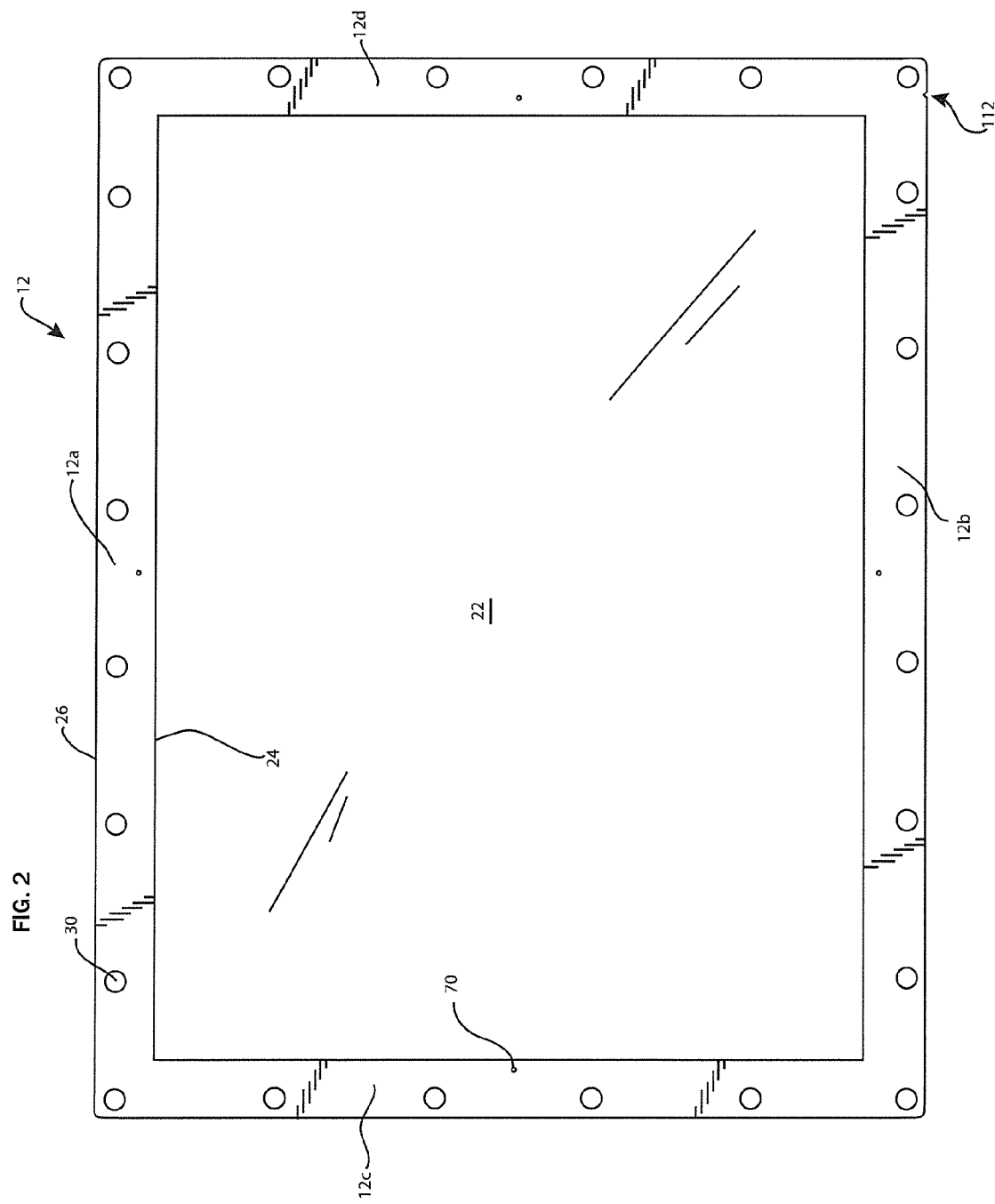

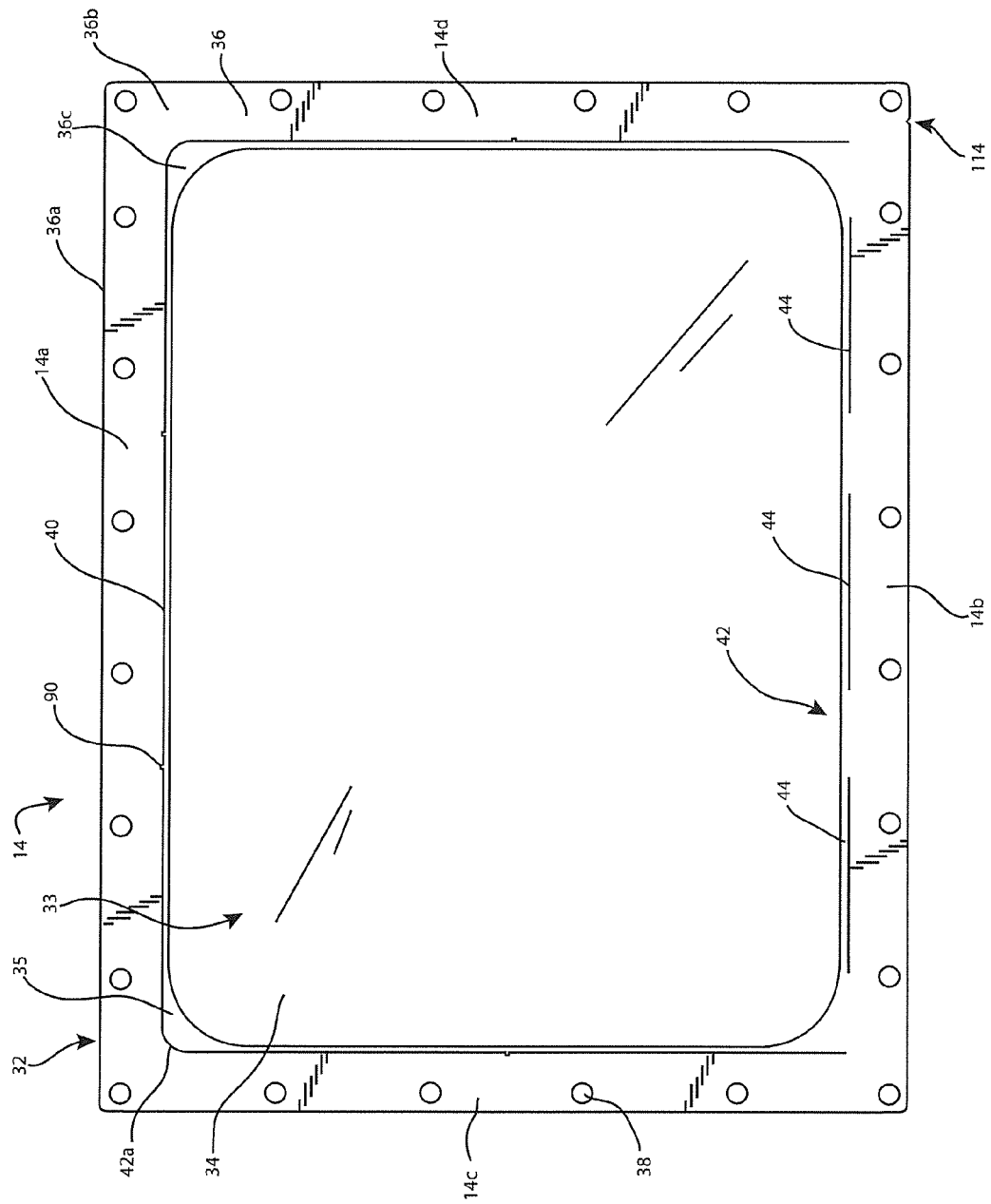

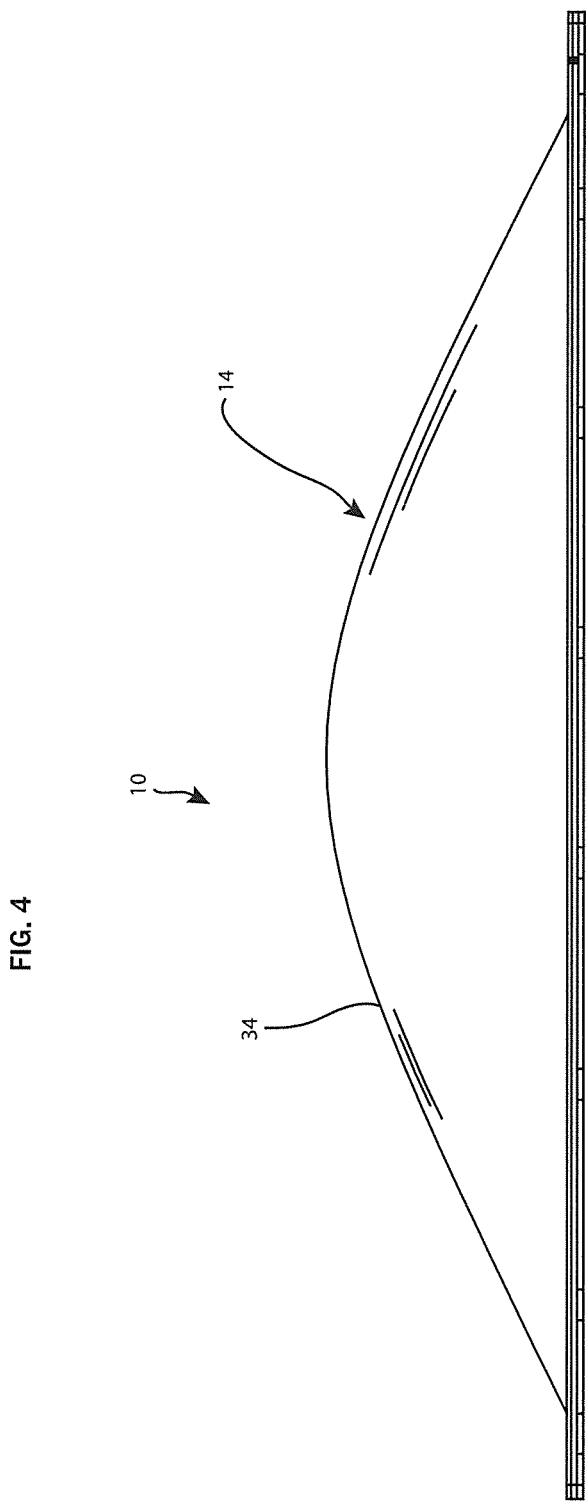

APPARATUS, SYSTEM, AND METHOD FOR VENTING PRESSURE IN A PRESSURIZED SYSTEM

CROSS REFERENCE TO RELATED APPLICATIONS

This application claims the benefit of U.S. Provisional Application 61/470,943, filed Apr. 1, 2011 and assigned to the assignee herein, and is hereby incorporated by reference in its entirety herein.

FIELD OF THE INVENTION

This invention relates to a vent apparatus and, more particularly, to an explosion vent apparatus for use in high pressure vacuum chamber cycling.

BACKGROUND

Prior explosion vents are known for preventing pressure buildups within pressurized systems, such as pressure buildups caused by explosions or the like. The systems may include one or more chambers where pressure buildups can occur. These explosion vents are typically installed at multiple locations of a pressurized system for relieving pressure buildup at that location. In the event that the pressure within the system increases beyond a threshold level, the explosion vent will open, relieving the pressure.

In addition to relieving a pressure buildup, the explosion vents are also configured to withstand a vacuum pressure, or back pressure, that occurs inside the chamber during pressure cycling. Thus, these devices must be configured to withstand a back pressure caused by vacuum cycling while also being configured to burst in the forward direction in the event of a pressure buildup.

One type of vent apparatus is in the form of a door that is configured to open in the event that pressure rises above a predetermined level. However, this door type vent apparatus was generally not airtight, which resulted in undesirable air leakage from the pressurized system.

Another type of vent apparatus is in the form of a steel frame structure having plywood or cardboard wall panels secured with fasteners. The fasteners are configured to break at a predetermined high pressure. However, this arrangement withstands substantially the same forward and back pressure burst levels due to the flat nature of the panels and the fasteners.

Yet another vent apparatus is in the form of a sheet metal panel having perforations formed therein. A plastic seal is disposed along one side of the sheet metal to prevent air leaks within the system. The metal sheet includes a domed portion that is configured to withstand the back pressure on the sheet. The predetermined burst pressure in the forward direction is generally determined by the number of perforations and the size of the dome. As pressure increases, the tension in the sheet will cause the sheet to burst at the perforations to relieve the pressure buildup. Thus, this arrangement requires substantially different configurations for the sheet metal panel for different burst ratings, and the manufacturing process for different domed panels requires additional tooling, adding to the cost of manufacturing these different vent apparatuses.

Another vent apparatus can include a metal sheet having multiple domed portions, with a slit extending through the domed portions. The metal sheet withstands inlet pressure by using multiple connectors that are riveted or fastened to the sheet across the slit on the domed portion. The connectors are configured to break at a predetermined pressure. When pressure increases beyond the predetermined level, the connectors will break to allow the sheet to open and for the pressure to be vented. The connectors are fastened to the sheet along the slit, which is located on the domed portions and is coated with an elastomeric seal to prevent leakage. However, this location of the slit and connectors thereon causes the metal material adjacent the slit to undergo a direct loading during pressure cycling, which can reduce the number of cycles that the vent apparatus will function correctly. Moreover, the exposure to the pressurized environment can result in a buildup of debris or other airborne product within the chamber at and around the slit in the domed portions. Furthermore, the installation of the multiple individual connector members is time consuming and increases the costs of manufacture.

BRIEF DESCRIPTION OF THE DRAWINGS

FIG. 2 is a plan view of an inlet frame of the vent apparatus of FIG. 1;

FIG. 3 is a plan view of a venting member of the vent apparatus of FIG. 1;

FIG. 4 is a front elevational view of the vent apparatus of FIG. 1;

DETAILED DESCRIPTION OF THE PREFERRED EMBODIMENTS

Figure 1:
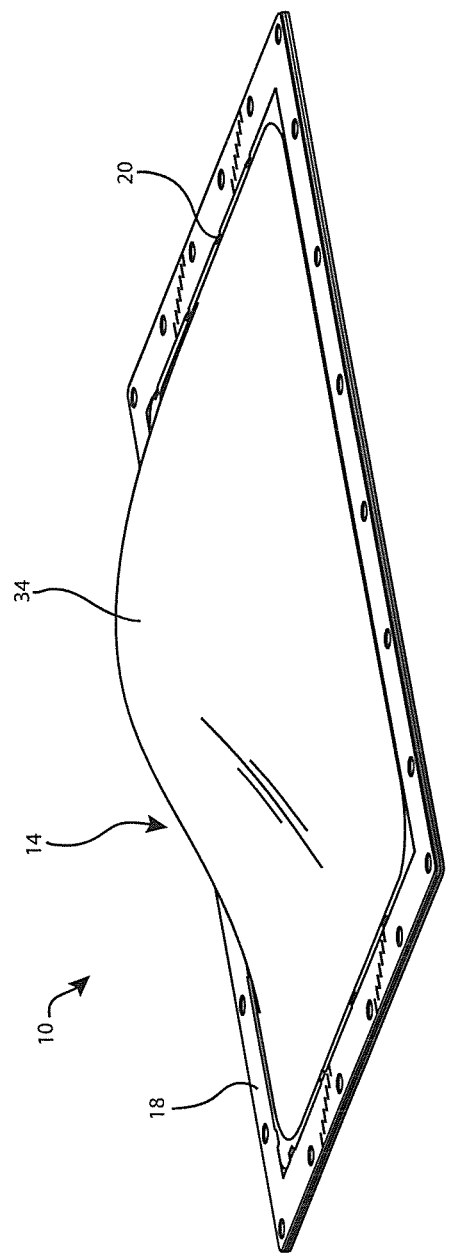
FIG. 1 is a perspective view of a vent apparatus for mounting to a pressurized system.
Figure 1A:
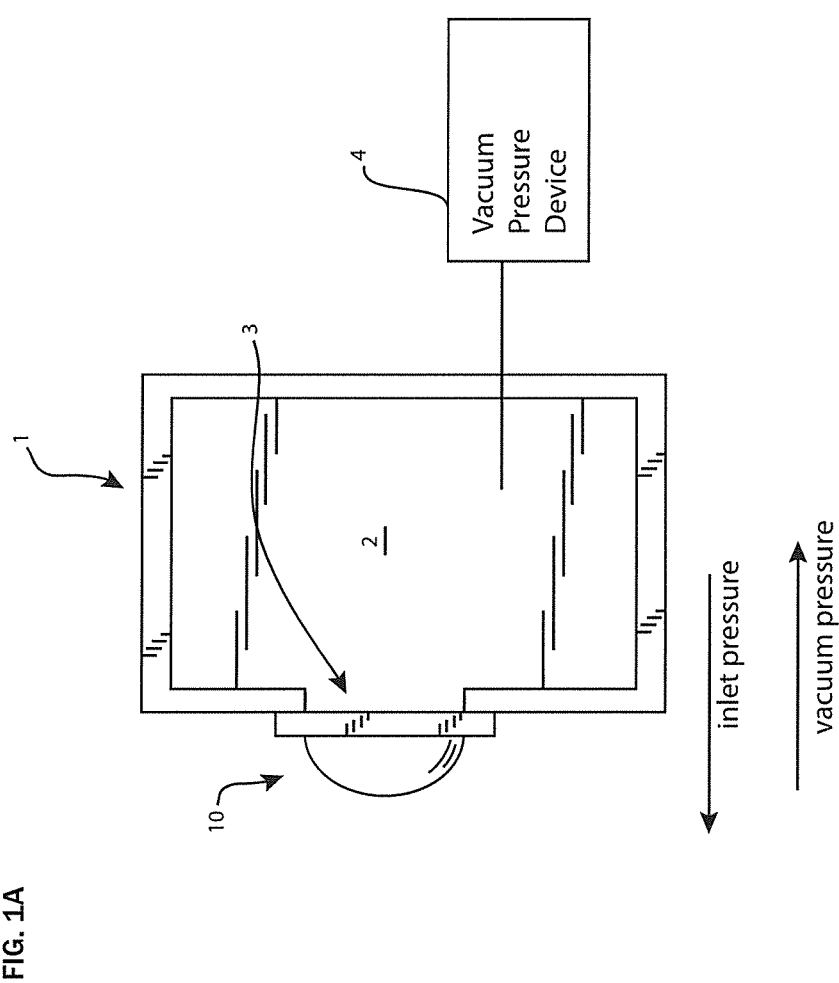
FIG. 1A is a schematic view of the vent apparatus of FIG. 1 mounted to the pressurized system.
Figure 1B:
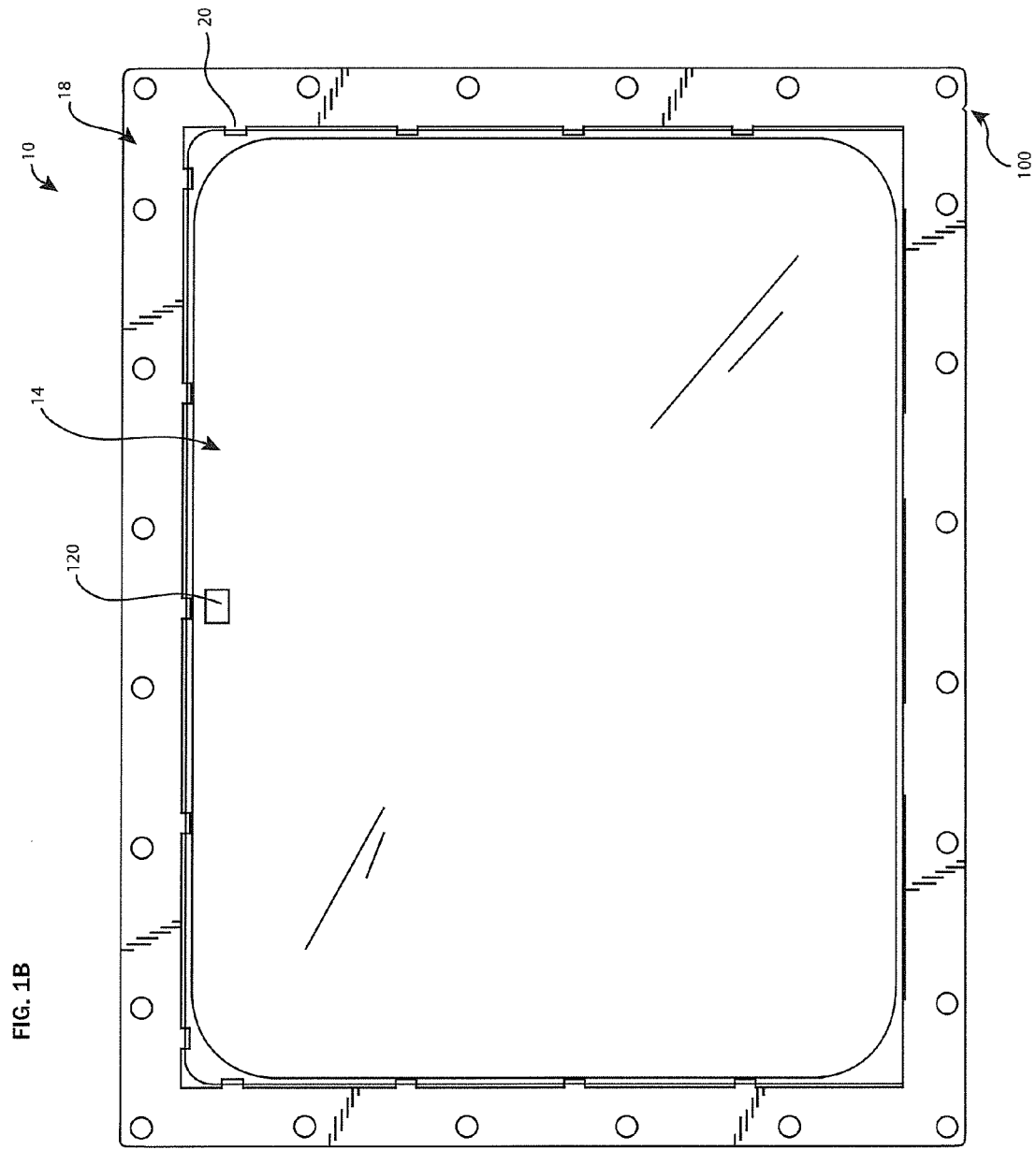
FIG. 1B is a plan view of the vent apparatus of FIG. 1.
Figure 5:
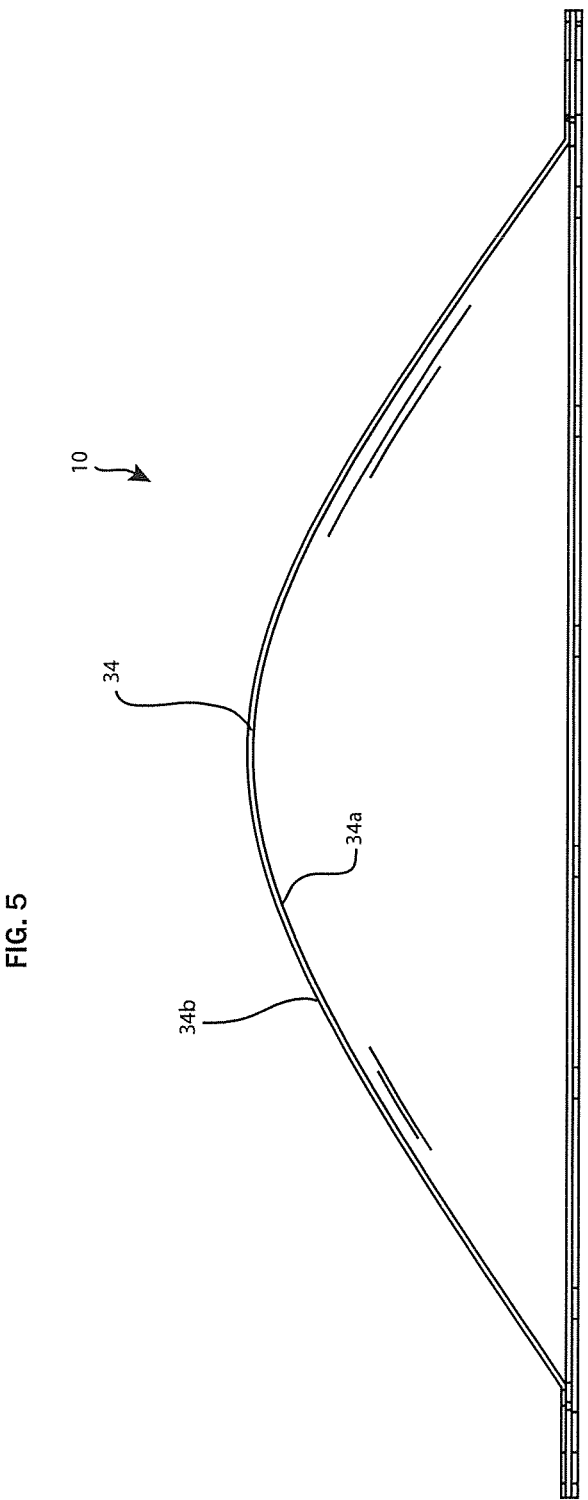
FIG. 5 is a left elevational view of the vent apparatus of FIG. 1.
Figure 6:
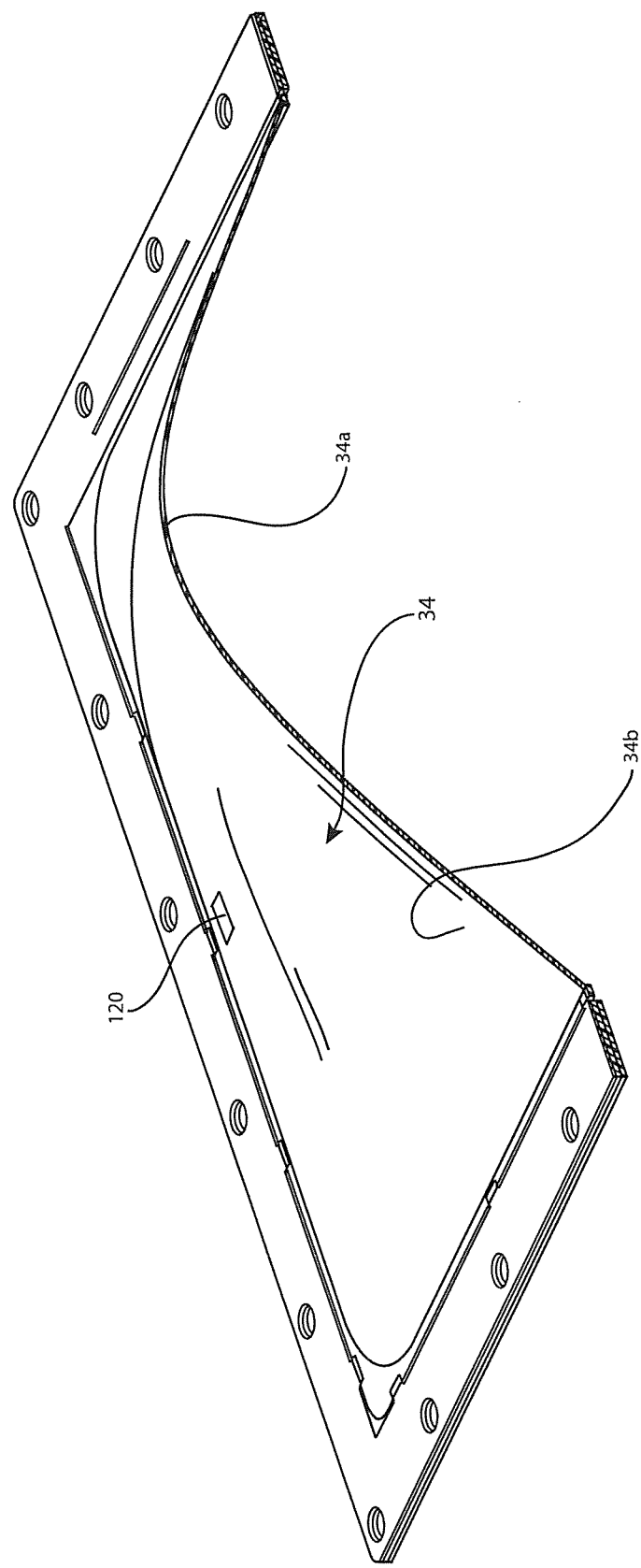
FIG. 6 is an isometric cross-sectional view of the vent apparatus of FIG. 1.

As illustrated in FIGS. 1-13, a vent apparatus 10 includes an inlet frame 12, a venting member 14, a gasket member 16, and a retainer member 18 having a plurality of vent retainer or tab portions 20.

The vent apparatus 10 is configured for use in a pressurized system 1 with high cycling, such as at least approximately 100,000 vacuum cycles and 45,000 forward pressure cycles as realized during testing, and is arranged to withstand a pressure buildup within a pressure chamber 2, at which point the vent apparatus 10 will open or burst. The system 1 may include a vacuum pressure device 4 for creating a vacuum pressure within the chamber 2. The vent apparatus 10 is further configured to withstand a relatively high back pressure caused by vacuum pressure, such as a vacuum pressure of 12 psig. The vent apparatus 10 is installed at a vent opening 3 along the pressurized system 1 as desired, thereby relieving a pressure buildup that may occur at the location of the vent apparatus 10. For reference, a positive pressure occurring within the system 1 will be referred to as inlet pressure, with a negative pressure within the system 1 referred to as back pressure or vacuum pressure. References to the inlet side will refer to the sides of the vent apparatus 10 and its components that face the pressurized system 1 on which the vent apparatus 10 is installed, with the outlet side referring to the sides that face away from the system 1.

As shown in FIG. 2, the inlet frame 12 has a generally rectangular shape having a top portion 12a, bottom portion 12b, left portion 12c, and right portion 12d. It will be appreciated that the use of the terms top, bottom, left, and right are for reference only and do not necessarily correspond to a specific orientation of the vent apparatus 10 where the top portion 12a is installed such that it is above the bottom portion 12b. For instance, the vent apparatus 10 could be installed horizontally on the system 1, or it could be installed such that the top portion 12a is oriented below the bottom portion 12b. The terms left and right generally refer to the portions of the vent apparatus 10 when viewing the vent apparatus 10 from the outlet side when the top portion 12a is oriented above the bottom portion 12b.

The inlet frame 12 includes an opening 22 therethrough for allowing pressurized air, gasses, or the like to be expelled during venting. The inlet frame 12 includes an inner rectangular edge 24 and an outer rectangular peripheral edge 26. Installation holes 30 are disposed along the inlet frame 12 adjacent the outer rectangular peripheral edge 26 for allowing bolts or other fastening devices to extend therethrough to secure the vent apparatus 10 to corresponding structure of the pressurized system 1.

As shown in FIGS. 3-6, the venting member 14 is in the form of a metal sheet 32 having a middle portion 33 that includes a domed portion 34 and a generally flat outer portion 35. The domed portion 34 has a concave side 34a and convex side 34b. When installed, the venting member 14 can be oriented such that the concave side 34a faces the pressurized system 1. The middle portion 33 generally covers the vent opening 2 when the vent apparatus 10 is installed on the system 1 and the pressure within the system 1 is below the burst pressure.

The venting member 14 includes a top portion 14a, bottom portion 14b, left portion 14c, and right portion 14d that are flat and extend about the domed portion 34 to form a flat rectangular shaped mounting portion 36, which includes an outer rectangular peripheral edge 36a. The mounting portion 36 includes mounting holes 38 that are disposed along the venting member 14 adjacent the outer rectangular peripheral edge 36a and which correspond to the locations of the installation holes 30 of the inlet frame 12 when assembled so the holes 30 and 38 are aligned.

The venting member 14 further includes a weakened area or a frangible portion, such as a line of weakness in the form of a perforation or relatively thin material or, as in the illustrated and preferred form, a burst slit 40. More specifically, the burst slit 40 is formed in the venting member 14 and extends in a generally U-shaped path around the dome portion 34. The middle portion 33 is the portion of the venting member 14 that is inboard of the burst slit 40. The U-shape is oriented such that the slit 40 extends along the left portion 14c, across the top portion 14a between the left portion 14c and right portion 14d, and along the right portion 14d. The burst slit 40 extends continuously along the mounting portion 36 to create the U-shape. The burst slit 42 preferably includes a pair of corner radii 42a where the burst slit 40 transitions between the top portion 14a and the left and right portions 14c and 14d. The burst slit 40 allows the middle portion 33 to bend or hinge away from the mounting portion 36 when the predetermined burst pressure has been reached within the system 1 on the inlet side. In one form, the burst slit 40 is formed using a laser cutter with a kerf width of approximately 0.010 inches. With the burst slit 40 formed in the flat mounting portion 36, the mounting portion 36 thereby includes a flat outboard mounting portion 36b that is outboard of the burst slit 40 and a flat inboard mounting portion 36c that is inboard of the burst slit 40. The flat inboard mounting portion 36c generally corresponds to the flat outer portion 35 of the middle portion 33. Thus, when assembled, the tab members 20 extend across the mounting portion 36, the burst slit 40, and the flat outer portion 35 of the middle portion 33, but can also be said to extend across the outboard mounting portion 36b, the burst slit 40, and the inboard mounting portion 36c.

The bottom portion 14b includes a hinge portion 42 that extends along the bottom portion 14b between the left portion 14c and right portion 14d. The hinge portion 42 includes one or more hinge weakened areas or hinge slits 44 that are equally spaced apart laterally along the hinge portion 42. The hinge slits 42 allow the venting member 40 to bend about the hinge portion 42 when the predetermined burst pressure has been reached. In one form, the hinge slits 44 are approximately four to twelve inches in length, with two inches therebetween, and the maximum number of hinge slits 44 that satisfies these conditions can be used. Alternatively, the hinge portion 42 can be in the form of perforations or other means of providing a weakened area extending along the hinge portion to allow for the middle portion 33 to pivot relative to the mounting portion 36 while staying hingedly connected thereto, or the hinge portion 42 can be free from having a weakened area or the like, and the middle portion 33 can still pivot about the hinge portion 42 due to the burst slit 40 allowing for a moment load on the middle portion 33 during venting.

As described above, the middle portion 33 can be both connected to and separable from the mounting portion 36, such that a portion of the middle portion 33 can shift and separate away from the mounting portion 36 in response to the inlet pressure within the system rising above the predetermined burst pressure, while also maintaining a connected portion therewith by bending about the hinge portion 42. This arrangement can be referred to as retained and the domed portion 34 is non-fragmenting. However, the middle portion 33 could be configured to completely break away from the mounting portion 36 if desired, and/or the domed portion 34 could have sections that break away from the remainder of the retained domed portion.

Figure 7:
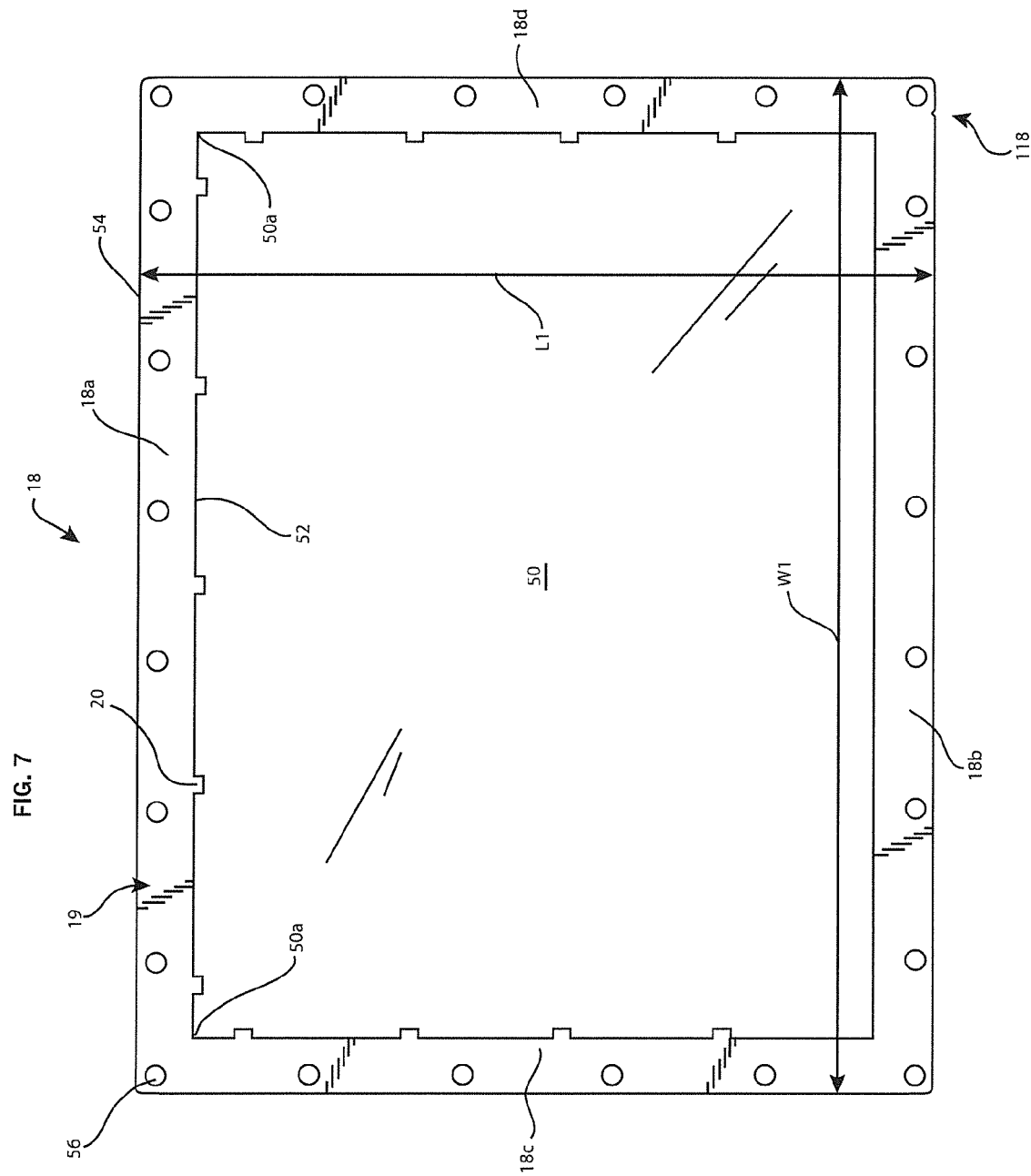
FIG. 7 is a plan view of a retainer member of the vent apparatus of FIG. 1.
Figure 8:
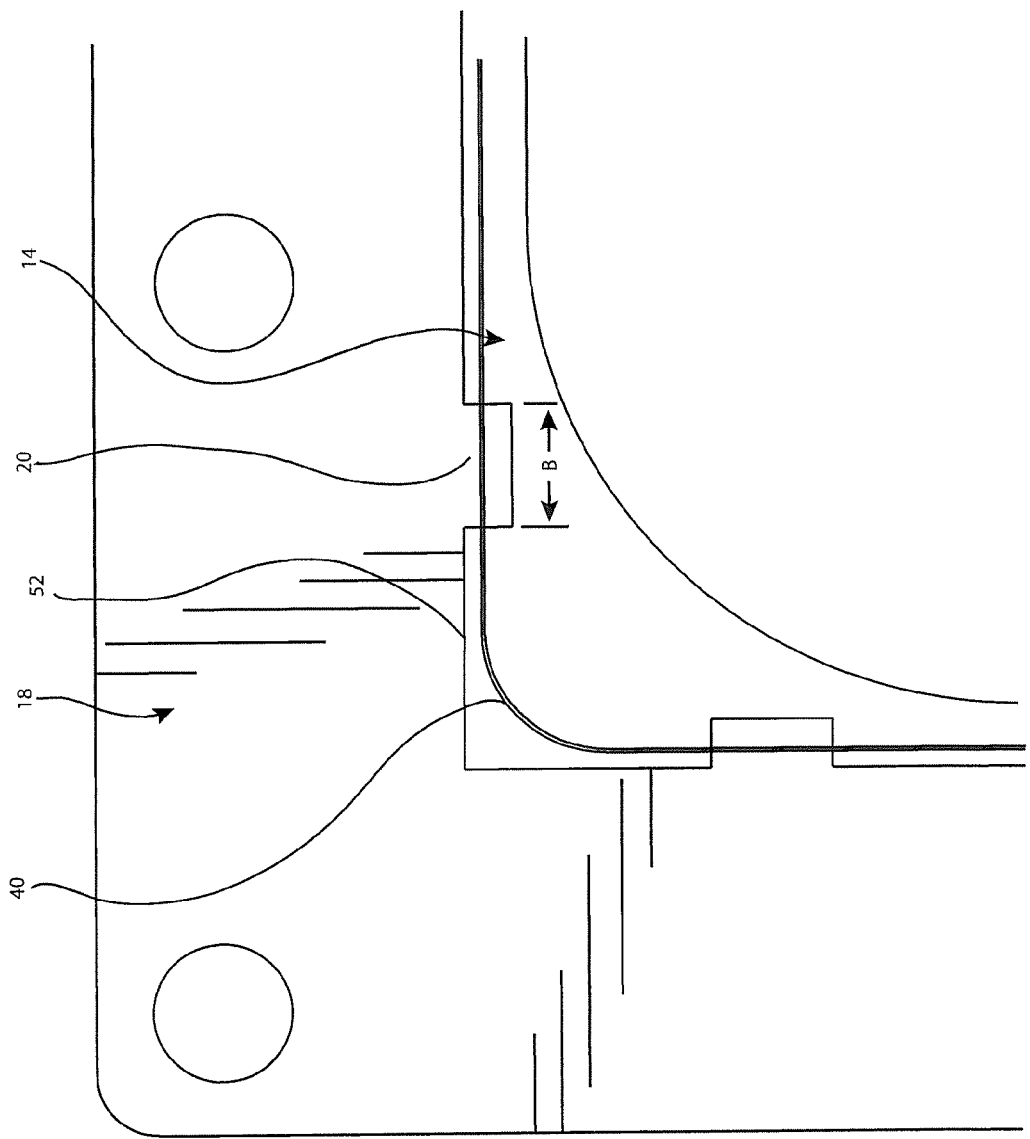
FIG. 8 is an enlarged, fragmentary view of the vent apparatus of FIG. 1, showing tab portions of the retainer member and a burst slit of the venting member.
Figure 9:
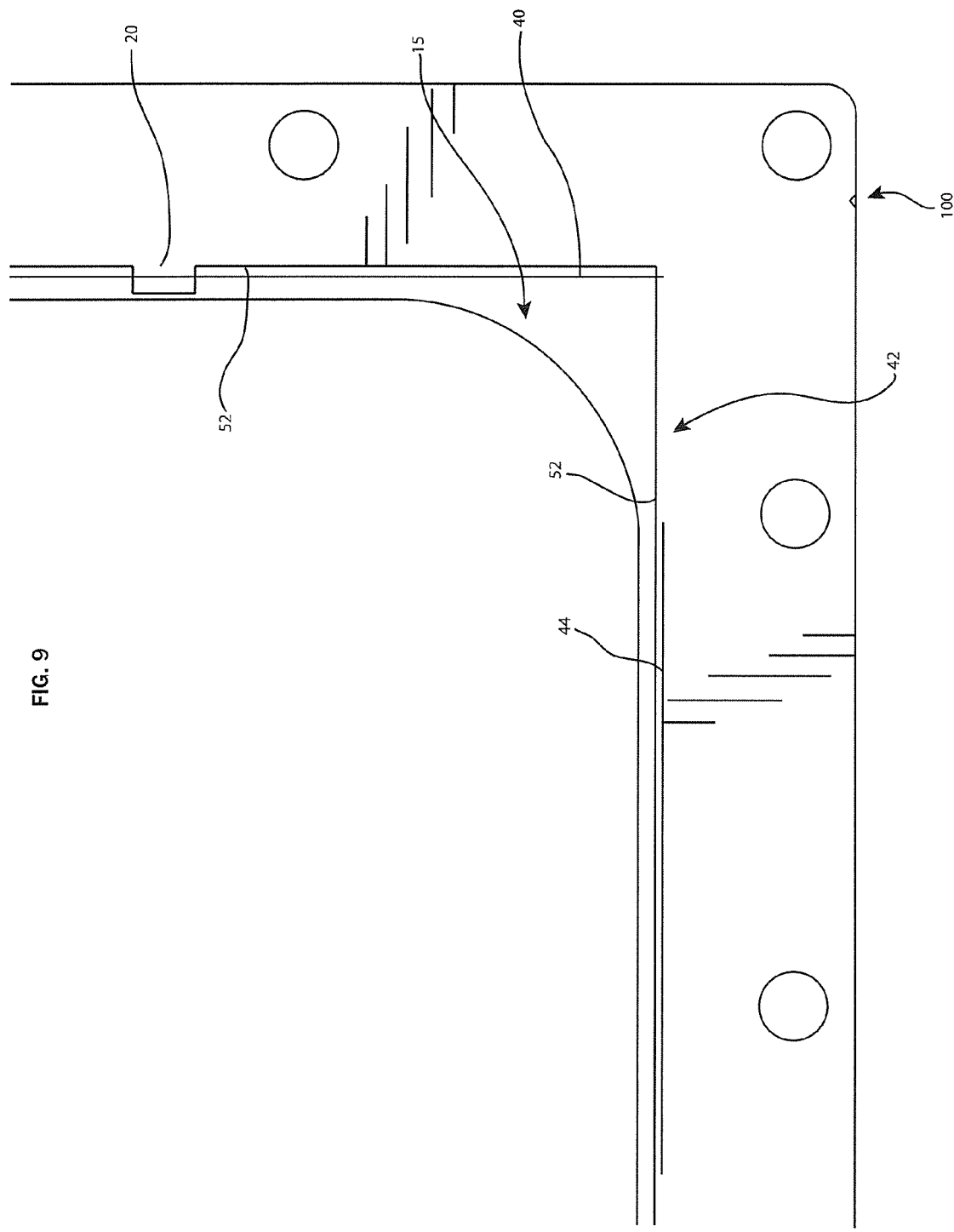
FIG. 9 is an enlarged, fragmentary view of the vent apparatus of FIG. 1, showing the burst slit and a hinge portion of the venting member and another tab portion of the retainer member.

With reference to FIGS. 7-9, the retainer member 18 includes the plurality of vent retainer portions or tab portions 20. In one form, the tab portions 20 are integrally formed with a main or rectangular body or frame portion 19 of the retainer member 18 to form of a plurality of crenellations or ramparts therealong. The retainer member frame portion 19 has a generally rectangular shape similar to the inlet frame 12. Accordingly, the retainer member frame portion 19 includes a top portion 18a, bottom portion 18b, left portion 18c, and right portion 18d. The retainer member 18 includes an opening 50 through which the middle portion 33 of the venting member 14 can pass through during venting. The retainer member frame portion 19 includes an inner rectangular edge 52 and an outer rectangular peripheral edge 54. Mounting holes 56 are disposed adjacent the outer rectangular peripheral edge 54 that correspond to the holes 38 and 30 of the venting member 14 and inlet frame 12 to be aligned therewith when assembled.

The tab portions 20 have a generally rectangular shape and extend inwardly from the inner edge 52 at the top portion 18a, left portion 18c, and right portion 18d. The tab portions 20 are sized and located according to the desired burst tolerance of the vent apparatus 10. The sizing of the tab portions 20 to determine the burst pressure will be described in further detail below. The tab portions 20 are preferably equally spaced no more than approximately six inches apart along a particular side of the retainer member frame portion 19. In one form, the tab portions 20 are located approximately one inch inboard of the upper corners 50a of the opening 50, and the minimum number of tab portions 20 are then disposed therebetween along the inner edge 52 without exceeding the approximate maximum six inch spacing.

The tab portions 20 are configured to support against an inlet pressure acting on the concave side 34a of the venting member 14, while also being configured to give way and bend when the predetermined burst pressure has been reached. Once the inlet pressure has risen to the predetermined burst pressure, the resulting force on the tab portions 20 applied by the middle portion 33 along the burst slit 40 causes the tab portions 20 to bend away in an outward direction relative to the interior of the pressure chamber 2 to allow the venting member 14 to shift past the tab portions 20 by bending about the hinge portion 42 and through the opening 50 in the retainer member 18. The tab portions 20 support against a load acting on the concave side 34a. On the other hand, due to their positioning over the convex side 34b of the venting member 14, a load on the venting member 14 in the direction of the outlet side toward the inlet side, such as due to back pressure caused by vacuum pressure within the pressurized system 1, will generally result in the load being carried by the inlet frame 12, whereas the tab portions 20 will generally be free from loading when the system is under back pressure conditions.

Figure 10:
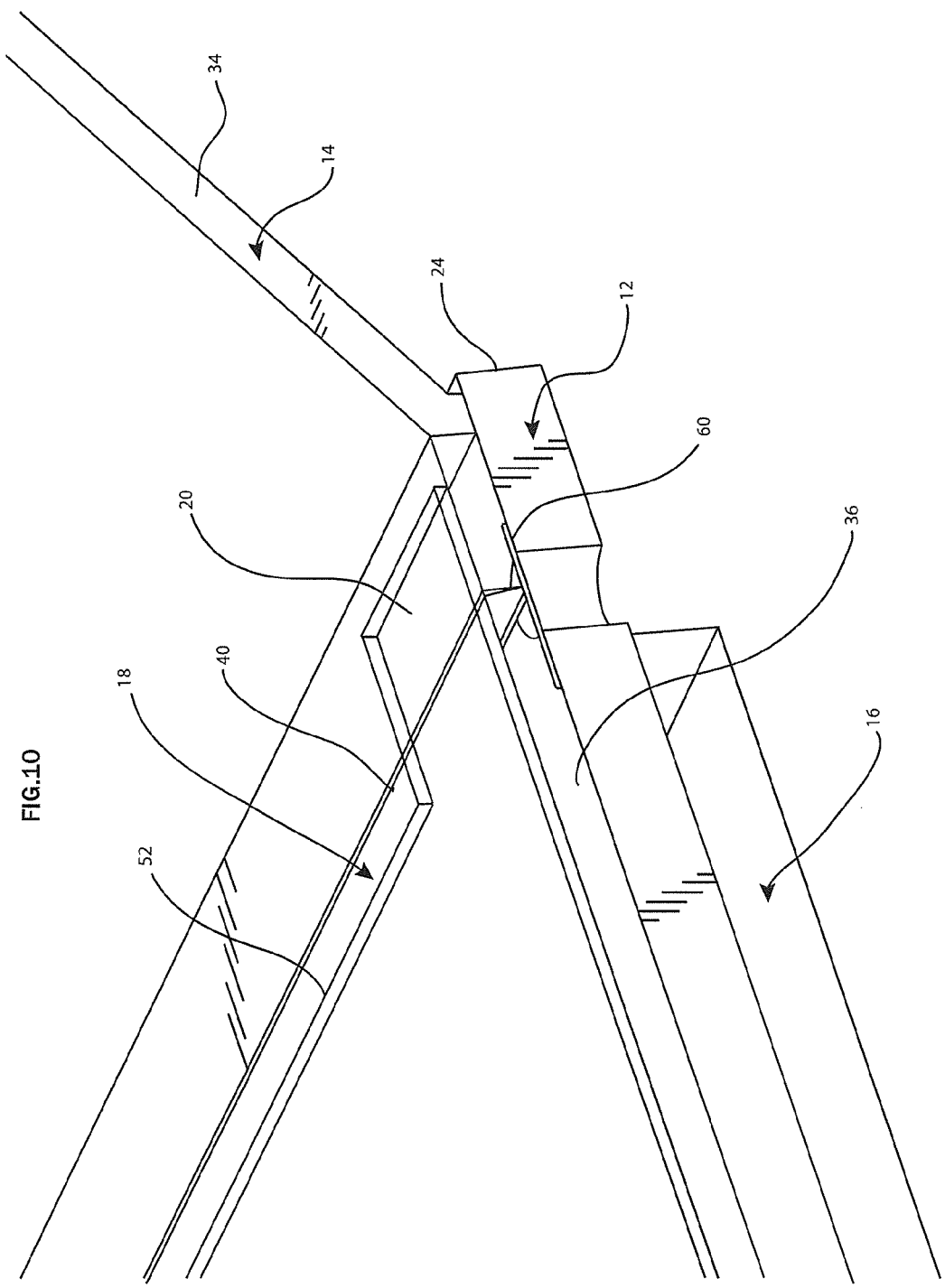
FIG. 10 is an enlarged perspective view of the vent apparatus of FIG. 1 showing an inner edge of the retainer member being outboard of the burst slit of the venting member, the burst slit being outboard of an inner edge of the inlet frame, sealing tape between the inlet frame and the burst slit of the venting member, and a gasket mounted to the inlet frame.
Figure 11:
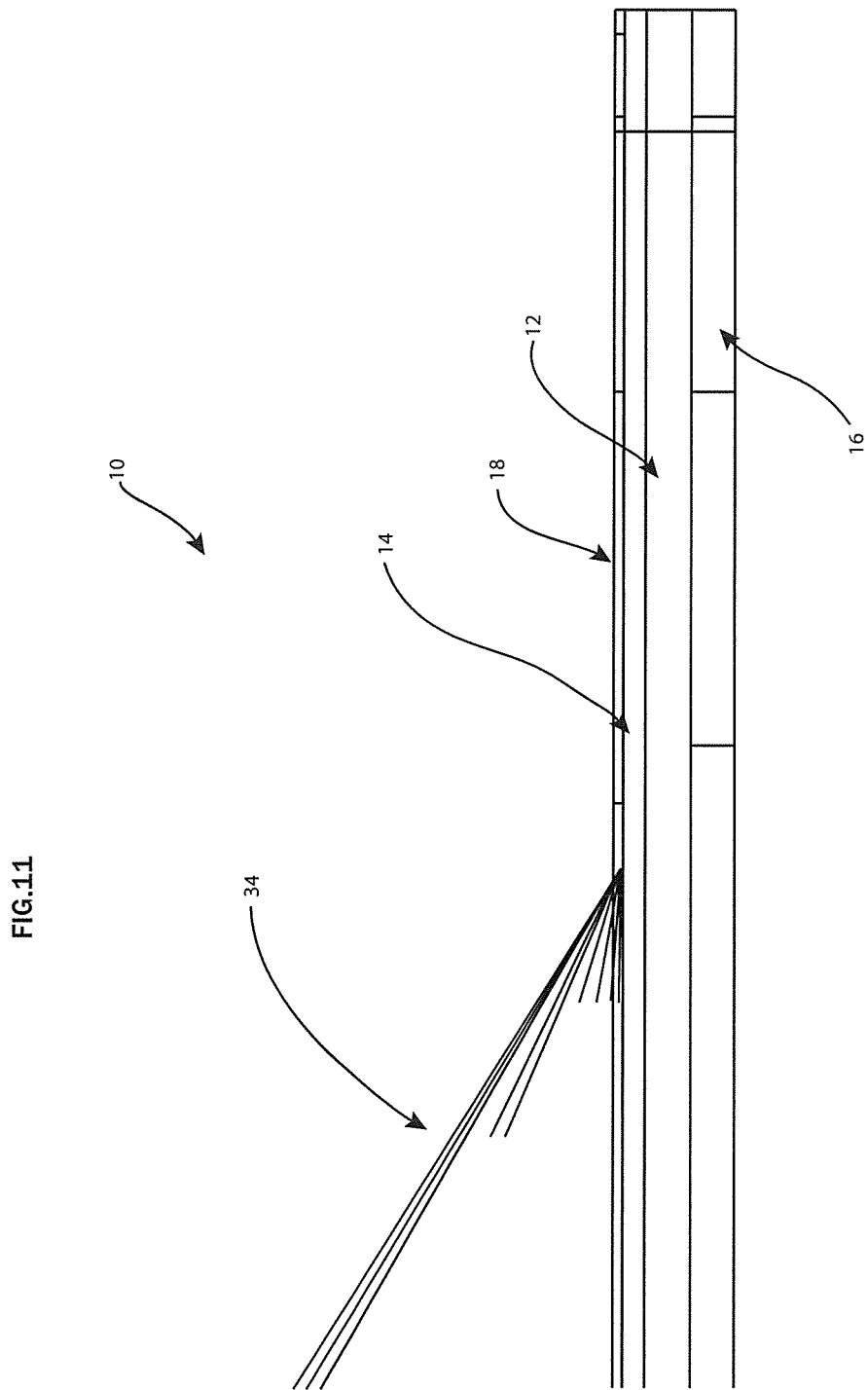
FIG. 11 is a partial front elevational view showing a mounting arrangement of the gasket, inlet frame, venting member, and retainer member.

As shown in FIGS. 10 and 11, the vent apparatus 10 can be assembled in a stack type arrangement with the components stacked in the following order: gasket member 16, inlet frame 12, venting member 14, retainer member 18, with the gasket 16 being between the inlet frame 12 and the supporting structure of the system 1. As assembled, the mounting portion 36 of the venting member 12 is sandwiched between the retainer member 18 and the inlet frame 12, with the domed portion 34 extending through the opening 50 of the retainer member 18. Each of these components includes an outlet side and an inlet side, with the inlet side facing the pressure chamber 2 when installed on the system, and the outlet side facing away from the pressure chamber when installed.

To assemble the vent apparatus 10, the flat mounting portion 36 of the venting member 14 is aligned with the retainer member 18, and the venting member 14 is mounted to the retainer member 18. Due to the provision of the vent retainer portions or tab portions 20 of the retainer member 18, the tab portions 20 are thus simultaneously oriented to extend across the burst slit 40 as an incidence of mounting the retainer member 18 to the venting member 14. Similarly, the inlet frame 12 is aligned with the venting member 14 and mounted thereto. In addition to the simultaneous orientation of the tab member 20 over the burst slit 40, the frame portion 19 of the retainer member 18 is also simultaneously oriented across the hinge portion 42. Thus, the arrangement of the vent apparatus 10 is such that the assembly thereof can be performed in a manner that is more efficient than the individual installation of multiple retainer components.

In one form, the vent apparatus 10 can include an alignment notch 100 for aligning the various components. More specifically, the inlet frame 12 includes an alignment notch 112, the venting member 14 includes an alignment notch 114, and the retainer member 18 includes an alignment notch 118. The alignment notches 112, 114, and 118 have a generally right triangular shape for aligning the components of the vent apparatus 10; however, other suitable alignment shapes could also be used.

Figure 12:
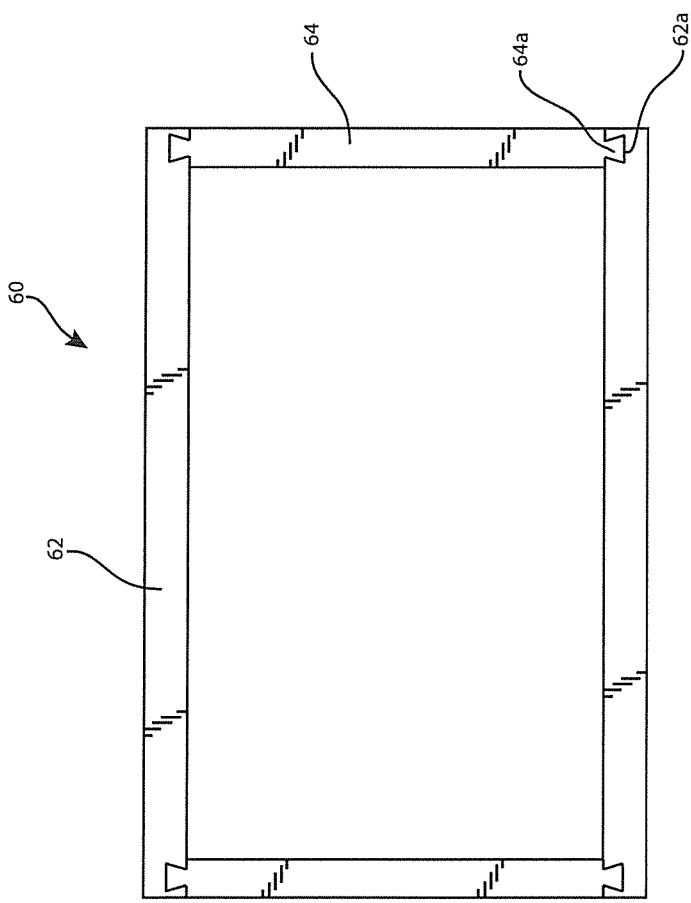
FIG. 12 is a plan view of the sealing tape.

As shown in FIG. 12, the vent apparatus 10 further includes sealing tape 60 that is disposed along the burst slit 40 and the hinge slits 44 and between the venting member 14 and the inlet frame 12. The sealing tape 60 is installed in a generally rectangular arrangement and includes two long side members 62 and two short side members 64. The short side members 64 have a pair of male dovetail portions 64a, with the long side members 62 having a pair of corresponding female dovetail portions 62a. The sealing tape 60 can be of an expanded silicone material with a silicone adhesive. The tape 60 is applied to the venting member 14 along the on the side of the venting member 14 corresponding to the concave side 34a of the dome portion 34 so that the tape 60 will be between the venting member 14 and the inlet frame 12 when assembled. The inlet frame 12 is then attached to the venting member 14, such as via spot welding, which compresses the sealing tape 60 to create a generally airtight seal. The inlet frame 12 includes four sight holes 70 at each side portion that can be used to verify that the sealing tape 60 has been installed.

With reference again to FIG. 10, when the vent apparatus 10 is assembled, the inner rectangular edge 24 of the inlet frame 12 is located inboard of the burst slit 40 and the hinge slits 44. In one form, the inner rectangular edge 24 is approximately 1.82 inches from the outer edge 26. The burst slit 40 and hinge slit 44 are located approximately 1.5625 inches from the outer edge 26, so the sealing tape 60 disposed along the burst slit 40 and hinge slits 44 will create a generally airtight seal between the inlet frame 12 and the venting member 14. Similarly, the gasket member 16 provides a generally airtight seal between the inlet frame 12 and the chamber 2.

Thus, when installed on the system 1, the gasket 16 between the inlet frame 12 and the structure and the sealing tape 60 between the venting member 14 and the inlet frame 12 provides a generally airtight installation of the vent apparatus 10 on the pressurized system 1. in one form, the gasket 16 can be made from a neoprene material; however, other types of gasket material can be used if desired.

With reference to FIG. 8, the retainer member 18 has an overall length L1 and overall width W1. A particular vent apparatus 10 has burst area that is classified in a length by width manner L×W, such as 18×24. In one form, the length L1 can be L+3 and the width W1 of W+3, where L and W are the dimensions of the desired venting area. For example, on an 18×24 vent apparatus, the length L1 of the retainer member 18 would be 21 inches, and the width W1 would be 27 inches. The top portion 18a, left portion 18c, and right portion 18*d* can be approximately 1.49 inches between the outer edge 54 and inner edge 52. The span of the retainer member 18 at these portions is to ensure that the venting member 14 can bend through the ring 18 when the burst pressure has been reached. As shown in FIG. 10, the inner edge 52 of the retainer member 18 is outboard of the burst slit 40, which is outboard of the inner rectangular edge 24 of the inlet frame 12. The bottom portion 18*b* of the retainer member 18 has a width of approximately 1.62 inches between the outer edge 54 and the inner edge 52, so that the bottom portion 18*b* covers the hinge portion 42 and hinge slits 44 of the venting member 14. The hinge portion 42 is intended to allow the middle portion 33 of the venting member 14 to bend thereabout, and the overlay of the bottom portion 18*b* over the hinge portion 42 can allow the vent apparatus 10 to retain the middle portion 33 after the vent apparatus 10 has burst.

As previously described, the tab portions 20 provide support against the load being exerted toward the concave side 34*a* of the venting member 14. As shown in FIGS. 1 and 8-10, when assembled, the tab portions 20 extend inwardly from the inner edge 52 of the retainer member 18. The retainer member inner edge 52 is inboard of the burst slit 40 of the venting member such that there is generally no overlap between the burst slit 40 and retainer member 18, aside from the tab portions 20, except for a small portion of the burst slit 40 that can extend below the retainer member 18 near the hinge portion 42 (FIG. 9). The tab portions 20, however, extend across the burst slit 40 to provide the support against the inlet force acting on the venting member 14. When the tab portions 20 are in a generally unbent condition, the middle portion 33 remains generally in place and sealed, with the venting member 14 remaining intact and the mounting portion 36 thereof sandwiched between the retainer member 18 and the inlet frame 12. When the inlet pressure increases beyond the predetermined burst level, the tab portions 20 will be bend away from the venting member 14 in response, and the middle portion 33 will bend about the hinge portion 42 and past the bent tab portions 20, thereby venting the increased pressure through the burst vent apparatus 10.

The vent apparatus 10 can be installed at multiple locations throughout the pressurized system 1. For purposes of illustration, a single vent apparatus 10 will be referenced; however, the principles behind the use of a single vent apparatus 10 can be applied to the use of multiple vent apparatuses, as well. For instance, four vent apparatus 10 could be installed at the system 1, and a pressure spike near one or more of the vent apparatus 10 would cause the vent apparatus to burst at that location.

The vent apparatus 10 is assembled and mounted to the structure of the system 1 via bolts or other suitable fasteners as required. The vent apparatus 10 is mounted to the system 1 with the gasket 16 between the inlet support frame 12 and the supporting structure of the system 1. The venting member 14 is mounted to the inlet support frame 12 with the domed portion 34 positioned away from the system 1 structure such that the concave side 34*a* of the domed portion 34 faces the pressurized system 1. The sealing tape 60 is mounted between the burst slit 40 of the venting member 14 and the inlet support frame 12. The retainer member 18 is mounted to the venting member 14 so that the mounting portion 36 of the venting member 14 is sandwiched between the retainer member 18 and the inlet support frame 12.

As pressure increases within the system 1, the venting member 14 will receive a pressurized load acting on the concave side 34*a* of the domed portion 34, which puts the domed portion 34 and the venting member 14 in tension. The middle portion 33 and, more specifically, the flat outer portion 35 of the middle portion 33 adjacent the burst slit 40 will act against the tab portions 20 disposed about the retainer member 18 and positioned over the burst slit 40. When the pressure remains below the predetermined burst pressure, the vent apparatus 10 will remain intact and sealed with the tab portions 20 resisting against the outward force acting on the middle portion 33, and the system 1 will continue to operate in a pressurized condition below the predetermined burst level with the middle portion 33 covering the vent opening 2. When the inlet pressure rises above the burst level, the tab portions 20 are sized such that they will no longer be able to resist against the outward force acting on the middle portion 33, and the tab members 20 will bend away from the venting member 14 and the middle portion 33 will shift away from the mounting portion 36 and past the bent tab members 20 for venting the pressure within the chamber 2.

The pressurized system 1 can often undergo a vacuum condition, where a negative vacuum pressure is applied. This vacuum condition will cause a back pressure exerted on the vent apparatus 10. Rather that exerting a load against the concave side 34*a* of the venting member 14, the load will be exerted in the reverse direction, which puts the venting member 14 and the domed portion 34 in compression. The compression force is transferred from the domed portion 34 and the middle portion 33 to the area of the burst slit 40. However, the inlet frame 12 is positioned behind the burst slit 40 at the interface between the venting member 14 and the inlet frame 12, thereby covering the weakened area or burst slit 40 on the inlet side of the venting member 14 and shielding the burst slit 40 from the pressure chamber 2. Thus, the inlet frame 12 receives and supports against the compression load on the middle portion 33 caused by the back pressure of the vacuum condition. The positioning of the burst slit 40 over the inlet frame 12 so the inlet frame 12 is behind the burst slit 40 results in a larger amount of support relative to the support provided by the tab portions 20. Therefore, the vent apparatus 10 can withstand a greater amount of vacuum pressure than forward pressure, which is further described below.

The vent apparatus 10 is capable of various configurations to be able to withstand multiple levels of forward burst pressure while also being capable of withstanding a high amount of vacuum pressure. These various configurations are generally determined by the sizing of the tab portions 20, with the remainder of the vent apparatus 10 having relatively consistent sizing for a given burst area. For example, in an 18×24 vent apparatus 10, the sizing of the inlet frame 12, the sizing of the venting member 14, and the overall size of the retainer member 18 (not including the size of the tab portions 20) remain generally the same regardless of the desired burst pressure.

In one form, the inlet frame 12 has a fixed thickness of 0.090 inches to withstand against vacuum force. The overall outer dimensions of the inlet frame 12 are L+3 and W+3, with the dimensions of the opening 22 being L−0.64" and W−0.64", so that the distance between the outer edge 26 and inner rectangular edge 24 is approximately 1.82 inches. The sight holes 70 are approximately 0.26 inches outboard of the inner rectangular edge 24.

For a given vent area, the venting member 14 can be the same, regardless of the rated burst pressure of the device. For example, the dome portion 34 and thickness of the venting member 14 will be the same for each vent apparatus 10 with a vent area of 18×24. The dome portion 34 height and thickness are configured to be able to withstand approximately twelve psig of vacuum pressure. For example, for a venting member 14 having a vent area of 18×24 or smaller, the thickness of the domed portion 34 can be approximately 0.060 inches; for a venting member 14 having a vent area larger than 18×24, the thickness of the domed portion 34 can be approximately 0.075 inches. Furthermore, as the size of the venting member 14 increases with a given thickness, the height of the domed portion 34 increases to be able to withstand the desired vacuum pressure. For example, for a venting member 14 with an 18×24 vent area, the height of the domed portion can be approximately 4.7 inches; for a smaller, 12×24 vent area, the height of the domed portion can be approximately 3.6 inches. For a venting member 14 having a vent area larger than 18×24, such as 18×35, the domed portion 34 is thicker, and the height of the domed portion can be approximately 3.5 inches. In one form, the footprint of the dome is approximately L−0.5" and W−0.5" so that the dome 34 is about 1.75 inches from the outer edge 36a of the venting member 14 so that the dome portion 34 has clearance from the tab portions 20. In one form, the venting member 14 is made from 316 Stainless Steel.

Therefore, with the venting member 14 and inlet support ring 18 having a generally fixed sizing, the vent apparatus 10 will be able to withstand approximately the same amount of vacuum pressure for a vent apparatus 10 with a given vent area. However, the predetermined pressure at which the vent apparatus 10 will burst can be adjusted to different levels by varying the number, the size, and the spacing of the tab members 20 to suit the particular pressurized application.

As described above, the burst pressure of the vent apparatus 10 is determined by the size of the tab portions 20. The retainer member 18 and tab portions 20 may have a thickness of approximately 0.016 inches. The tab portions 20 extend approximately 0.20 inches from the inner edge 52, which results in the tab portions 20 extending over the burst slit 40 when installed. The base width B of the tab portion 20 is determined in the following manner: $B = k*(0.42*Bp*A)/(\sigma v*N)$ where B is the base width; k is a correction factor based on experimentation; Bp is the desired burst pressure; A is the burst area (such as 18×24); σv is the ultimate strength of the metal; and N is the number of tab portions 20. In one form, the correction factor k can be approximately 0.5. The maximum space between tab portions 20 can be approximately six inches. The tab portions 20 can be spaced from the corners 50a of the retainer member inner edge 52 a distance of one inch, and the minimum number of tab portions 20 can be used that satisfies the above conditions.

Alternatively, the shape of the tab member 20 can be altered, if desired, to a non-rectangular form. With a different shape, the base width B of the tab member 20 will still generally determine the inlet pressure at which the venting member 14 will force the tab member 20 to bend away for allowing the vent apparatus 10 to burst and vent the overpressure. The distance at which the tab member 20 extends from the inner edge 52 can be altered, if desired, and doing so will increase or decrease the lever arm of the force applied to the tab member which increases or decreases the bending moment on the tab member 20. A larger distance that the tab member 20 extends will thereby result in the tab member 20 bending away at a lower inlet pressure relative to a tab member 20 having the same base width B but extending a shorter distance from the inner edge 52.

Thus, for an 18×24 burst area, burst levels can be set, for purposes of illustration and not limiting, between 1.25 psig and 6.25 psig by varying the base width B. Of course, other burst areas can also be used, and various burst ratings for these other burst areas can be achieved by varying the base width of the tab portions 20.

Based on experimentation, the vent apparatus 10 has been tested to approach an approximately 20:1 ratio between the vacuum pressure that the vent apparatus 10 can withstand and the forward burst pressure at which the vent apparatus 10 will burst. For example, the vent apparatus 10 can be made to withstand a back pressure of 12 psig based on the fixed size of the dome portion 34, the thickness of the venting member 14, and the fixed sizing of the inlet frame 12. Based on the 20:1 ratio, while being able to withstand 12 psig of back pressure, the device can be made to burst as low as 0.6 psig. Thus, the vent apparatus 10 can be used in systems where it is desirable for the pressurized air to vent when the pressure reaches a relatively low level, but be able to withstand a high amount of vacuum pressure. Of course, the predetermined burst pressure can be increased if it is desired to withstand a higher pressure before the venting.

While the venting member 14 and inlet frame 12 can have fixed sizes to withstand twelve psig of vacuum back pressure, it will be appreciated that other sizing can be used so the venting member 14 can withstand a higher or lower vacuum pressure. Generally speaking, as the dome size is decreased, the venting member 14 can withstand a lower amount of vacuum pressure before buckling. For reference, a vacuum pressure refers to a pressure lower than atmospheric pressure, which is approximately 100 KPa, so a lower amount of vacuum pressure refers to pressure that is closer to atmospheric pressure, and a higher amount of vacuum pressure refers to pressure that is relatively far below atmospheric pressure. For example, a vacuum with a pressure of 100 mPa or 100 nPa is a higher vacuum pressure than 3,000 Pa. If the dome height is increased, the venting member 14 can withstand a higher amount of vacuum pressure. Similarly, as thickness is increased, the venting member 14 can withstand a higher amount of vacuum pressure. However, as you increase the height of the dome or the thickness to withstand a greater amount of vacuum pressure, the venting member 14 can be limited in its ability to burst at relatively lower pressure levels. It is often desirable to relieve pressure that rises to a relatively low level while also being able to run a high pressure vacuum in the system 1, but if a low burst level is not necessary in some applications, the vent apparatus 10 may be modified as desired.

During operation of the system 1, as the pressure increases but remains below the rated burst pressure (as generally determined by the sizing of the tab portion 20), the vent apparatus 10 will remain intact and the system 1 will continue to run in a pressurized state that is below the rated burst pressure. In the event of a pressure buildup at the vent apparatus 10, such as when the pressure increases beyond the rated burst pressure of the vent apparatus 10, the force on the venting member 14 will be translated to the tab portions 20 due the overlap between the tab portions 20 and the burst slit 40, thereby causing a bending moment on the tab portions 20. The bending moment will cause the tab portions 20 to bend away from the venting member 14 and open. The venting member 14 will then swing past the bent tab portions 20 and about the hinge portion 42, relieving the pressure buildup at the vent apparatus 10.

The above description has been described in a manner that retains the venting member 14 when it swings about the hinge portion 42; however, this is not required for the vent apparatus 10 to operate.

The vent apparatus 10 described above provides a robust and easy to manufacture solution for relieving a pressure buildup within a pressurized system 1. This configuration allows for the same inlet frame 12, venting member 14, sealing tape 60, and gasket 16 for a given vent area. The tab portions 20 of the retainer member 18 are varied to determine the desired predetermined burst pressure by adjusting the base width B. The single domed configuration of the venting member 14 is easier to manufacture than multiple domed solutions that have been used to provide support against a high vacuum pressure. Moreover, the lack of exposed perforations in the venting member 14 allows the system 1 to be cycled a high number of times without constantly exerting a force directly against a perforated portion. Furthermore, the use of tab portions 20 to support against the forward pressure, rather than rivets or other fasteners designed to give way at a certain pressure, allows for a faster and easier manufacturing process.

The vent apparatus 10 has been described as acting in a one-way configuration, with a burst pressure rating for loads applied at one side (the inlet side), and a vacuum pressure configuration acting in the opposite direction. However, the vent apparatus 10 could also be configured to operate in a bi-directional manner where the burst level could be controlled by tab portions 20 on either side of the venting member 14 instead of using the inlet frame 12 to support against back pressure. This configuration can result in a lower amount of back pressure that the vent apparatus 10 can withstand, but can be used in situation where withstanding a high vacuum pressure is not desired.

The venting member 14 can also be round or another non-rectangular shape. Furthermore, the venting member 14 may be flat instead of domed. For example, for a bi-directional vent apparatus 10, a flat shape could be used with tab portions 20 on either side with the same configuration so that a burst pressure that arises on one side could be vented to the other side. Alternatively, the tab portion 20 size and orientation could be altered on either side of the flat venting member 14, so that a different burst pressure could be used at different sides.

Figure 13:
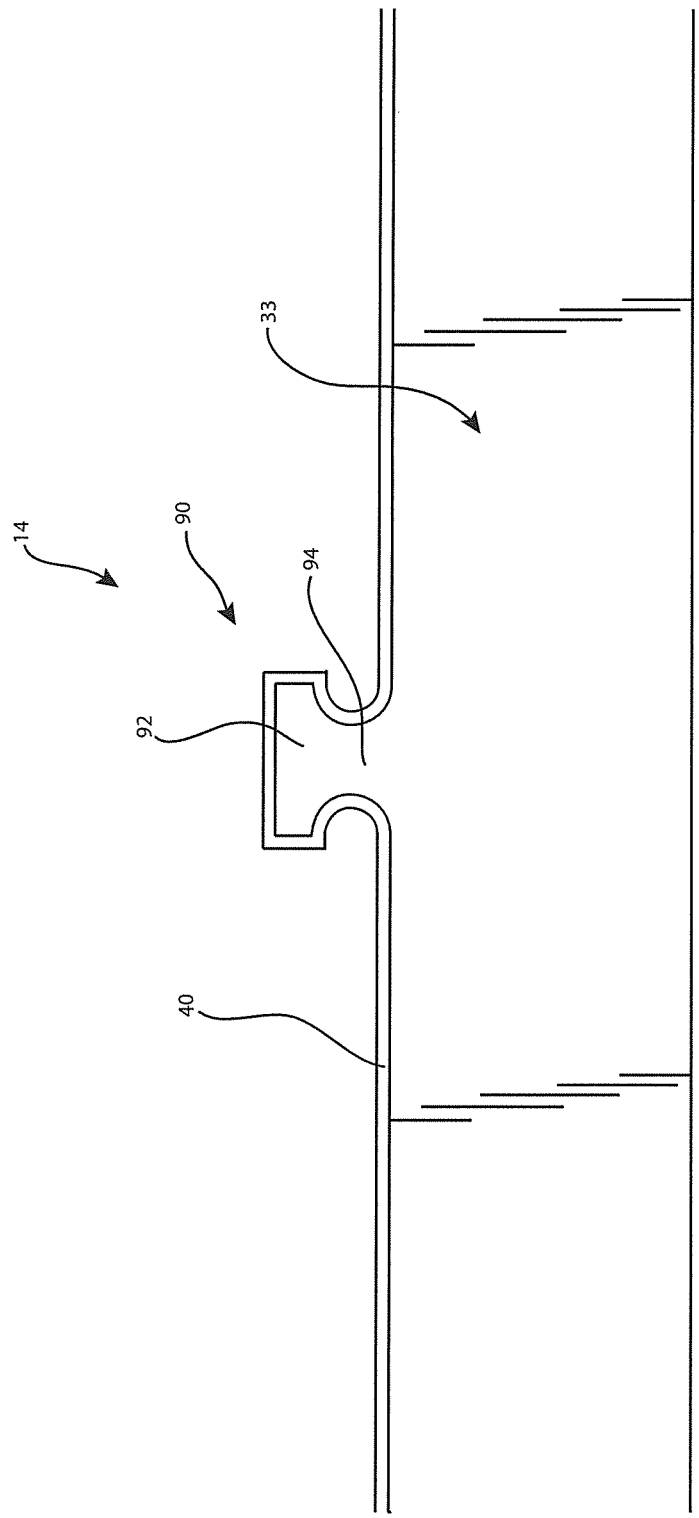
FIG. 13 is a partial plan view of the venting member showing a cleat portion formed by the burst slit.

As shown in FIG. 13, in another form, the venting member 14 can include multiple cleat portions 90 formed by the burst slit 40. The cleat portion 90 has a T-shape that is formed by the burst slit 40. More specifically, the cleat has a head portion 92 and a curved neck portion 94, with the neck portion 94 extending between the head portion 92 and the middle portion 33. In one form, the head portion 92 is approximately 0.02×0.09 inches in size, with the neck portion having a radius of approximately 0.024 inches with a width of approximately 0.042 inches, so that cleat portion 90 extends approximately 0.07 from the burst slit 40. The cleats 90 are configured to restrict movement of the venting member 14 during operation. It has been found that the middle portion 33 of venting member 14 can shrug out from under the retainer member 18 and the tab portions 20 during operation, so the shape of the cleat 90 and the head portion 92 can limit the amount that the middle portion 33 can shift in a generally inward direction toward the middle of the vent apparatus 10. In one form, the cleats 90 are disposed along the burst slit 40 once every twelve inches, so the number of cleats 90 will vary with the size of the vent apparatus 10; however other spacing for the cleats 90 can be used if desired.

In one form, the vent apparatus 10 may include a sensor 120 mounted to the convex side of the domed portion 34 and generally centered opposite the hinge portion 42. The sensor 120 can be in the form of a reed switch and magnet type, which can provide for an electronic indication of a burst vent apparatus 10. Of course, other suitable sensor types capable of providing an indication of a burst vent apparatus 10 could also be used, and the sensor 120 can be placed at different locations on the apparatus 10 if desired.

While there have been illustrated and described particular embodiments of the present invention, it will be appreciated that numerous changes and modifications will occur to those skilled in the art, and it is intended in the appended claims to cover all those changes and modifications which fall within the true spirit and scope of the present invention.

What is claimed is:

1. An apparatus for venting a pressure buildup, the apparatus comprising:
   a venting member for mounting to an opening of a chamber;
   a generally flat mounting portion of the venting member for operatively mounting the venting member to the chamber and having a weakened area thereof;
   a middle portion of the venting member inboard of the mounting portion and having a domed portion for extending over and covering the chamber opening with the flat mounting portion operatively mounted to the chamber; and
   a retainer member mounted to the generally flat mounting portion of the venting member to be spaced from the domed portion and to have at least one distinct, predetermined portion thereof extend across the weakened area of the venting member flat mounting portion so that the domed portion extends over and covers the chamber opening when a pressure level is below a threshold level and shifts away from the flat mounting portion via bending of the retainer member distinct, predetermined portion when the pressure level is above the threshold level to relieve pressure in the chamber.

2. An apparatus for venting a pressure buildup, the apparatus comprising:
   a venting member for mounting to an opening of a chamber;
   a generally flat mounting portion of the venting member for operatively mounting the venting member to the chamber and having a weakened area thereof;
   a middle portion of the venting member inboard of the mounting portion and having a domed portion for extending over and covering the chamber opening with the flat mounting portion operatively mounted to the chamber; and
   a retainer member mounted to the generally flat mounting portion of the venting member to extend across the weakened area of the venting member flat mounting portion so that the domed portion extends over and covers the chamber opening when a pressure level is below a threshold level and shifts away from the flat mounting portion when the pressure level is above the threshold level to relieve pressure in the chamber,
   wherein the middle portion includes a generally flat outer portion extending around the domed portion; and
   the venting member includes a frame portion and at least one vent retainer portion extending therefrom, the at least one vent retainer portion extending across the flat mounting portion of the venting member, the weakened area, and the middle portion outer portion so that the at least one vent retainer portion restricts the middle portion from shifting away from the flat mounting portion when the pressure level is below the threshold level and bends away from the middle portion to allow the domed portion to shift away relative to the mounting portion when the pressure level is above the threshold level.

3. The apparatus of claim 2 wherein the at least one vent retainer portion has a rectangular shape.

4. The apparatus of claim 1 wherein the weakened area comprises a slit extending through the venting member.

5. The apparatus of claim 1 wherein the venting member has an outlet side and an inlet side and the retainer member is mounted to the outlet side.

6. The apparatus of claim 5 further comprising an inlet frame mounted to the inlet side of the venting member.

7. An apparatus for venting a pressure buildup, the apparatus comprising:
- a venting member for mounting to an opening of a chamber;
- a generally flat mounting portion of the venting member for operatively mounting the venting member to the chamber and having a weakened area thereof;
- a middle portion of the venting member inboard of the mounting portion and having a domed portion for extending over and covering the chamber opening with the flat mounting portion operatively mounted to the chamber;
- a retainer member mounted to the generally flat mounting portion of the venting member to have at least one distinct, predetermined portion thereof extend across the weakened area of the venting member flat mounting portion so that the domed portion extends over and covers the chamber opening when a pressure level is below a threshold level and shifts away from the flat mounting portion via bending of the retainer member distinct, predetermined portion when the pressure level is above the threshold level to relieve pressure in the chamber,
- wherein the venting member has an outlet side and an inlet side and the retainer member is mounted to the outlet side; and
- an inlet frame mounted to the inlet side of the venting member, wherein the inlet frame covers the weakened area of the venting member on the inlet side for supporting against a vacuum pressure in the chamber.

8. The apparatus of claim 2 wherein the generally flat mounting portion includes a hinge portion that the middle portion can pivot about when the pressure level is above the threshold level and the domed portion is shifted away from the flat mounting portion.

9. The apparatus of claim 8 wherein the hinge portion has at least one hinge weakened area thereof, and the retainer member frame portion covers the at least one hinge weakened area.

10. A system for relieving a pressure increase, the system comprising:
- a pressure chamber having a vent opening and a surface extending about the opening;
- a venting member for being mounted to the pressure chamber;
- a domed portion of the venting member for extending over the vent opening;
- a generally flat mounting portion of the venting member for being operatively mounted to the pressure chamber surface;
- a weakened area formed in the generally flat mounting portion; and
- a retainer member mounted to the flat mounting portion of the venting member to have at least one distinct, predetermined portion thereof extend across the weakened area of the generally flat mounting portion so that the domed portion extends over and covers the vent opening when a pressure level within the pressure chamber is below a threshold level and shifts away from the flat mounting portion at the weakened area thereof via bending of the retainer member distinct, predetermined portion when the pressure level within the chamber is above the threshold level to relieve pressure in the chamber.

11. A system for relieving a pressure increase, the system comprising:
- a pressure chamber having a vent opening and a surface extending about the opening;
- a venting member for being mounted to the pressure chamber;
- a domed portion of the venting member for extending over the vent opening;
- a generally flat mounting portion of the venting member for being operatively mounted to the pressure chamber surface;
- a weakened area formed in the generally flat mounting portion; and
- a retainer member mounted to the flat mounting portion of the venting member to extend across the weakened area of the generally flat mounting portion so that the domed portion extends over and covers the vent opening when a pressure level within the pressure chamber is below a threshold level and shifts away from the flat mounting portion at the weakened area thereof when the pressure level within the chamber is above the threshold level to relieve pressure in the chamber,
- wherein the flat mounting portion includes a flat inboard portion and a flat outboard portion, with the weakened area extending therebetween, the flat inboard portion is adjacent the domed portion; and
- the retainer member includes a frame portion and at least one vent retainer portion extending therefrom, the at least one vent retainer portion extending across the flat outboard portion, the weakened area, and the flat inboard portion so that the at least one vent retainer portion restricts the domed portion from shifting away from the outboard portion when the chamber pressure is below a threshold level and bends away from the domed portion when the chamber pressure is above the threshold level to allow the domed portion to shift away from the outboard portion to relieve the pressure.

12. The system of claim 10 further comprising a vacuum pressure source operatively connected to the pressure chamber for causing a vacuum pressure within the chamber.

13. A system for relieving a pressure increase, the system comprising:
- a pressure chamber having a vent opening and a surface extending about the opening;
- a venting member for being mounted to the pressure chamber;
- a domed portion of the venting member for extending over the vent opening;
- a generally flat mounting portion of the venting member for being operatively mounted to the pressure chamber surface;
- a weakened area formed in the generally flat mounting portion;
- a retainer member mounted to the flat mounting portion of the venting member to extend across the weakened area of the generally flat mounting portion so that the domed portion extends over and covers the vent opening when a pressure level within the pressure chamber is below a threshold level and shifts away from the flat mounting portion at the weakened area thereof when the pressure level within the chamber is above the threshold level to relieve pressure in the chamber;

a vacuum pressure source operatively connected to the pressure chamber for causing a vacuum pressure within the chamber; and an inlet frame mounted between the venting member and the vent opening surface, the inlet frame extending behind the weakened area of the venting member for supporting against a load caused by a vacuum pressure from the vacuum pressure source and for shielding the weakened area from the pressure chamber.

14. The system of claim 11 wherein the venting member mounting portion includes a hinge portion for allowing the domed portion to pivot thereabout when the chamber pressure is above the threshold level.

15. The system of claim 14 wherein the weakened area is sized and configured to allow the domed portion to shift away from the mounting portion along the weakened area when the chamber pressure is above the threshold level and remain secured to the mounting portion along the hinge portion.

16. The system of claim 14 wherein the hinge portion includes at least one hinge weakened area, and the retainer member frame portion covers the hinge weakened area.

17. The system of claim 10 wherein the domed portion includes a concave side and a convex side and the concave side faces the chamber.

18. A system for relieving a pressure increase, the system comprising:
 a pressure chamber having a vent opening and a surface extending about the opening;
 a venting member for being mounted to the pressure chamber;
 a domed portion of the venting member for extending over the vent opening;
 a generally flat mounting portion of the venting member for being operatively mounted to the pressure chamber surface;
 a weakened area formed in the generally flat mounting portion; and
 a retainer member mounted to the flat mounting portion of the venting member to extend across the weakened area of the generally flat mounting portion so that the domed portion extends over and covers the vent opening when a pressure level within the pressure chamber is below a threshold level and shifts away from the flat mounting portion at the weakened area thereof when the pressure level within the chamber is above the threshold level to relieve pressure in the chamber, wherein the weakened area is in the form of a slit in the venting member, the venting member includes at least one cleat portion formed by the slit, the cleat portion includes a neck portion and an enlarged heard portion for restricting the middle portion from shifting in a generally inboard direction.

19. A method for assembling a vent apparatus, the method comprising:
 aligning a generally flat mounting portion of a venting member with a retainer member having multiple vent retainer portions;
 mounting the aligned retainer member having the multiple vent retainer portions to the flat mounting portion of the venting member; and
 simultaneously orienting the vent retainer portions of the retainer member to extend across a weakened area formed in the flat mounting portion as an incidence of the mounting of the aligned retainer member to the flat mounting portion so that the vent retainer portions are operable to resist relative shifting of portions of the flat mounting portion adjacent to and on opposite sides of the weakened area.

20. The method of claim 19 wherein the venting member has a domed portion formed thereon so that the generally flat mounting portion extends around the domed portion.

21. The method of claim 20 further comprising:
 aligning an inlet frame with the generally flat mounting portion on a side opposite the retainer member so that the inlet frame is behind the weakened area;
 mounting the aligned inlet frame to the venting member so that the inlet frame is operable to resist a load in the venting member acting on the inlet frame along the weakened area.

22. The method of claim 21 further comprising providing a sealing member between the weakened area and the inlet frame at an interface therebetween so that the sealing member is operable to resist air leakage between the venting member and the inlet frame.

23. The method of claim 19 further comprising forming the weakened area of the venting member using a laser cut.

24. The method of claim 19 further comprising:
 aligning a hinge portion of the venting member with a frame portion of the retainer member from which the vent retainer portions extend; and
 simultaneously orienting the frame portion to cover the hinge portion while orienting the vent retainer portions across the weakened area as an incidence of mounting the retainer member to the venting member.

* * * * *